United States Patent
Boer et al.

(10) Patent No.: US 9,604,580 B2
(45) Date of Patent: Mar. 28, 2017

(54) TOOL-LESS LOW PROFILE ROTATION MOUNT

(71) Applicant: Rosemount Aerospace Inc., Burnsville, MN (US)

(72) Inventors: Jonathan Boer, Lakeville, MN (US); Kenneth Freeman, Eagan, MN (US); Eric Lovaasen, Chaska, MN (US)

(73) Assignee: Rosemount Aerospace, Inc., Burnsville, MN (US)

( * ) Notice: Subject to any disclaimer, the term of this patent is extended or adjusted under 35 U.S.C. 154(b) by 0 days.

(21) Appl. No.: 14/744,317

(22) Filed: Jun. 19, 2015

(65) Prior Publication Data
US 2016/0368431 A1    Dec. 22, 2016

(51) Int. Cl.
| | |
|---|---|
| *A47F 5/00* | (2006.01) |
| *B60R 11/02* | (2006.01) |
| *F16M 13/02* | (2006.01) |
| *B64D 43/00* | (2006.01) |
| *B60R 11/00* | (2006.01) |

(52) U.S. Cl.
CPC .......... *B60R 11/0235* (2013.01); *B64D 43/00* (2013.01); *F16M 13/02* (2013.01); *B60R 2011/0003* (2013.01); *B60R 2011/0078* (2013.01); *B60R 2011/0085* (2013.01)

(58) Field of Classification Search
CPC ..................................................... F16M 11/08
USPC ....... 248/689, 442.2, 444.1, 451, 458, 118.1, 248/118.5, 289.11, 290.1, 349.1, 222.52, 248/415, 125.7; 361/679.55, 679.56; 403/349
See application file for complete search history.

(56) References Cited

U.S. PATENT DOCUMENTS

| | | | | |
|---|---|---|---|---|
| 4,620,685 A | * | 11/1986 | Taguchi | B65D 23/001 220/628 |
| 4,659,203 A | | 4/1987 | Niwa et al. | |
| 4,948,083 A | * | 8/1990 | McNaney, Jr. | A01K 91/08 248/289.11 |

(Continued)

FOREIGN PATENT DOCUMENTS

| | | |
|---|---|---|
| EP | 2803585 A1 | 11/2014 |
| EP | 2808593 A2 | 12/2014 |
| WO | 2013173091 A1 | 11/2013 |

OTHER PUBLICATIONS

Extended European Search Report for EP Application No. 16175266.2, dated Dec. 9, 2016, 5 pages.

*Primary Examiner* — Terrell McKinnon
*Assistant Examiner* — Michael McDuffie
(74) *Attorney, Agent, or Firm* — Kinney & Lange, P.A.

(57) ABSTRACT

A mount includes a keyed insert and a key receiver. The keyed insert includes a key base and a keyed plate mounted to the key base and having one or more key features extending from a periphery of the keyed plate. The key receiver accepts the keyed insert and includes a receiver base, a retaining ring, a key set ring, a key entrance ring, and a spring plate. The retaining ring is connected to the receiver base. The key set ring is disposed between the retaining ring and the receiver base and includes one or more receiving notches and one or more locking notches. The one or more receiving notches is configured to receive the one or more key features the one or more locking notch is spaced away from the one or more receiving notch and is configured to lockingly engage the one or more key features.

20 Claims, 6 Drawing Sheets

(56) References Cited

U.S. PATENT DOCUMENTS

| | | | | |
|---|---|---|---|---|
| 4,969,623 A * | 11/1990 | Bernier | ............... | B64D 43/00 248/441.1 |
| 5,451,022 A * | 9/1995 | Peterson | ............... | B60J 3/0221 248/289.11 |
| 6,292,142 B1 | 9/2001 | Pittman | | |
| 6,446,913 B1 * | 9/2002 | Schroeder | ............... | F16B 1/00 248/222.52 |
| 6,933,861 B2 * | 8/2005 | Wang | ............... | A63F 13/06 273/148 B |
| 7,708,239 B2 * | 5/2010 | Watanabe | ............... | F16M 11/08 248/125.7 |
| 7,802,931 B2 | 9/2010 | Kogure et al. | | |
| 8,020,816 B2 * | 9/2011 | Laitila | ............... | F16M 13/00 16/342 |
| 8,151,465 B2 * | 4/2012 | Hewitt | ............... | F16C 35/073 29/252 |
| 8,240,944 B2 * | 8/2012 | Chang | ............... | G09F 3/06 403/348 |
| 8,845,227 B2 * | 9/2014 | Colombo | ............... | F16B 21/02 403/348 |
| 2004/0178314 A1 * | 9/2004 | Chen | ............... | F16M 11/08 248/349.1 |
| 2006/0124818 A1 * | 6/2006 | Wai | ............... | F16M 11/08 248/349.1 |
| 2008/0175658 A1 * | 7/2008 | Peters | ............... | B60N 2/2356 403/349 |
| 2010/0050706 A1 * | 3/2010 | O'Neill | ............... | E05B 73/00 70/58 |
| 2010/0288902 A1 * | 11/2010 | Liu | ............... | F16M 11/10 248/349.1 |
| 2011/0101058 A1 | 5/2011 | Heckman | | |
| 2014/0262847 A1 | 9/2014 | Yang | | |
| 2014/0339385 A1 | 11/2014 | Boer et al. | | |
| 2015/0189962 A1 * | 7/2015 | Yeo | ............... | A45C 11/00 361/679.17 |

* cited by examiner

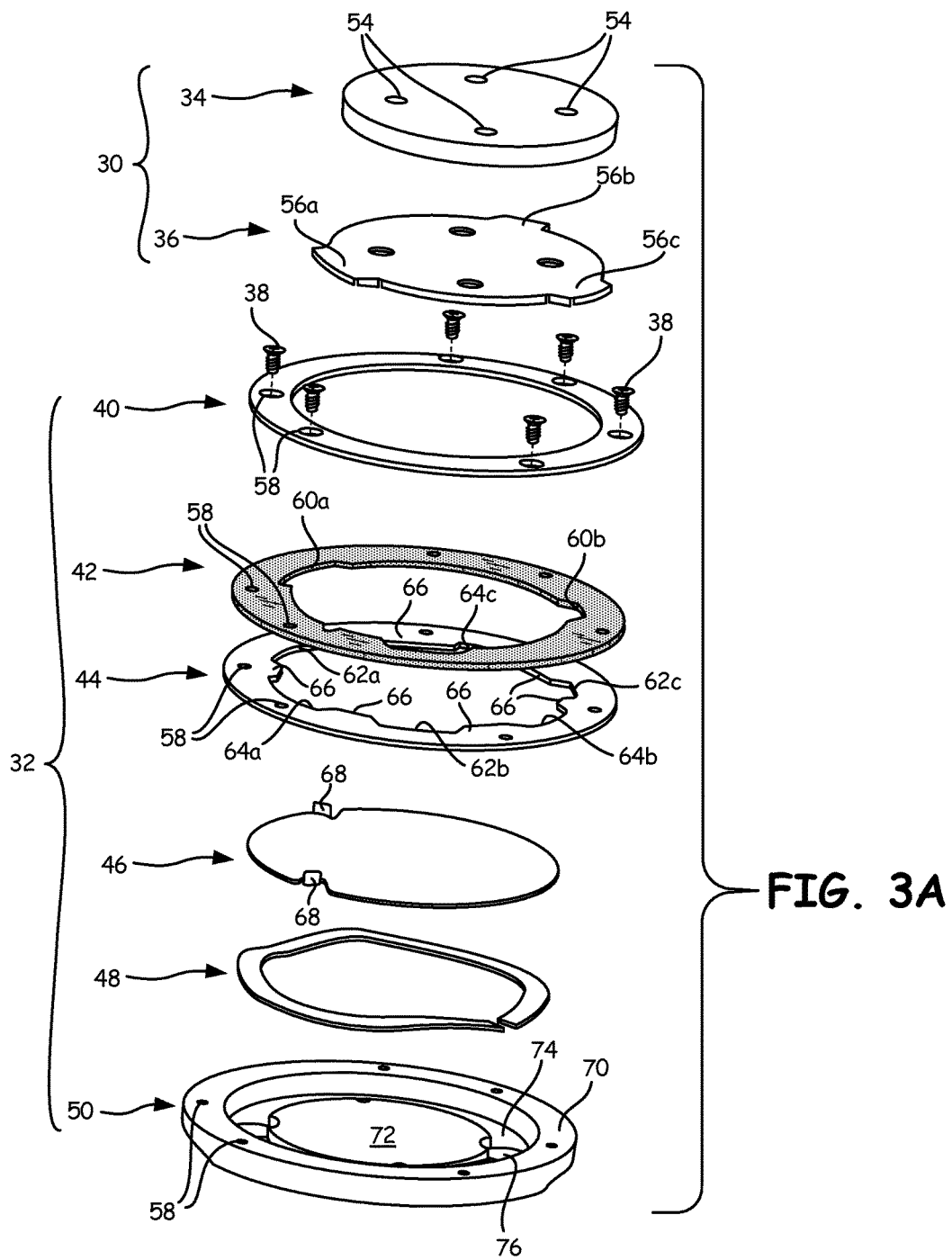

TOOL-LESS LOW PROFILE ROTATION MOUNT

BACKGROUND

Electronic devices, such as laptop computers, notebook computers, and tablet computers can be used to run independent programs. These devices can also send and receive data through a network where programs can be run in another environment, such as a cloud. Data input and output to and from a program or cloud, or the visual interface for the program or cloud, can be displayed on the electronic devices. Electronic devices having these capabilities have become increasingly versatile and have been adapted for a wide variety of uses from school work to flight control. These devices often include a touch-sensitive display input integrated into the device screens, which accept touch gestures such as tapping, pinching, or sliding. Because of the user interface required to perform touch gestures, many of these electronic devices require mounts that retain the electronic devices in orientations that allow for their touch screen to be accessed.

In addition, electronic devices have become increasingly portable, due in part to advancements in battery and processor technologies. Because of the portability, and fragility that is inherent in many electronic devices, cases and mounts have been developed to transport, mount, and store electronic devices. In some applications, electronic devices can require cases and mounts that allow for visibility and access to their touch screen input while producing suitable protection for their surrounding environments and methods of use.

SUMMARY

In one embodiment, a mount includes a keyed insert and a key receiver. The keyed insert includes a key base and a keyed plate mounted to the key base and having one or more key features extending from a periphery of the keyed plate. The key receiver accepts the keyed insert and includes a receiver base, a retaining ring, a key set ring, a key entrance ring, and a spring plate. The retaining ring is connected to the receiver base. The key set ring is disposed between the retaining ring and the receiver base and includes one or more receiving notches and one or more locking notches. The one or more receiving notches is configured to receive the one or more key features the one or more locking notch is spaced away from the one or more receiving notch and is configured to lockingly engage the one or more key features. The key entrance ring is disposed between the retaining ring and the key set ring, and includes one or more index notch aligned with the one or more receiving notch. The spring plate is movable between the key set ring and the receiver base.

In another embodiment, a system for securing a display device within a aircraft cockpit includes a device holder and a mount. The device holder has a front surface and a rear surface, and the front surface is configured to receive the display device. The mount is connected to the rear surface of the device holder. The mount includes a keyed insert and a key receiver. The keyed insert includes a key base and a keyed plate mounted to the key base and having one or more key features extending from a periphery of the keyed plate. The key receiver accepts the keyed insert and includes a receiver base, a retaining ring, a key set ring, a key entrance ring, and a spring plate. The retaining ring is connected to the receiver base. The key set ring is disposed between the retaining ring and the receiver base and includes one or more receiving notches and one or more locking notches. The one or more receiving notches is configured to receive the one or more key features the one or more locking notch is spaced away from the one or more receiving notch and is configured to lockingly engage the one or more key features. The key entrance ring is disposed between the retaining ring and the key set ring, and includes one or more index notch aligned with the one or more receiving notch. The spring plate is movable between the key set ring and the receiver base.

BRIEF DESCRIPTION OF THE DRAWINGS

FIG. 3A is a side isometric view of a receiver and insert of the mount of FIG. 2.

DETAILED DESCRIPTION

Figure 1:
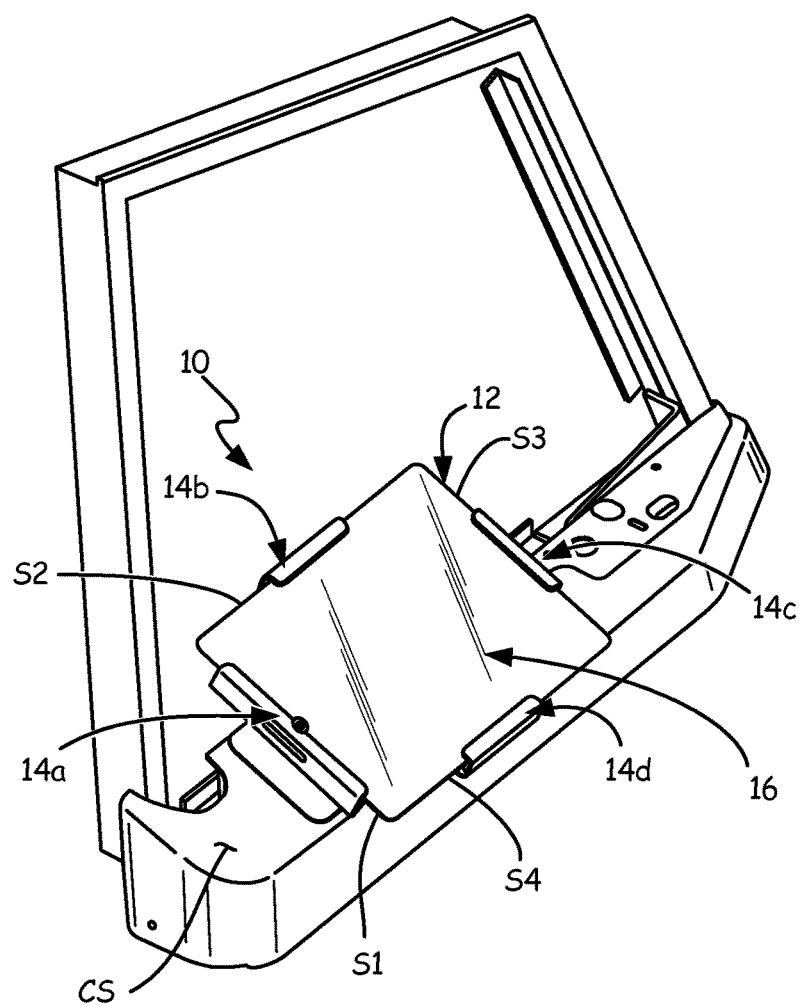
FIG. 1 is a perspective view of a display device mounted in an aircraft cockpit.

FIG. 1 is a perspective view of mount system 10 that can mount display device 12 within a cockpit of an aircraft, other uses are available, as discussed below. Mount system 10 includes arms 14a-14d. Also displayed in FIG. 1 are sides S1, S2, S3, S4, and cockpit surface CS. Display device 12 includes screen 16.

Arms 14a-14d are extensions of mount system 10 disposed around a periphery of mount system 10. Arm 14a is disposed at side S1; arm 14b is disposed at side S2; arm 14c is disposed at side S3; and, arm 14d is disposed at side S4. Arms 14a-14d contact display device at sides S1, S2, S3, and S4, respectively. Arms 14a-14d also contact screen 16 of display device 12.

Arms 14a-14d are configured to engage and restrain display device 12. Arm 14a can be a releasable arm, so that display device 12 can be easily inserted into and removed from mount system 10. Mount system 10 can be attached to cockpit surface CS.

Figure 2:
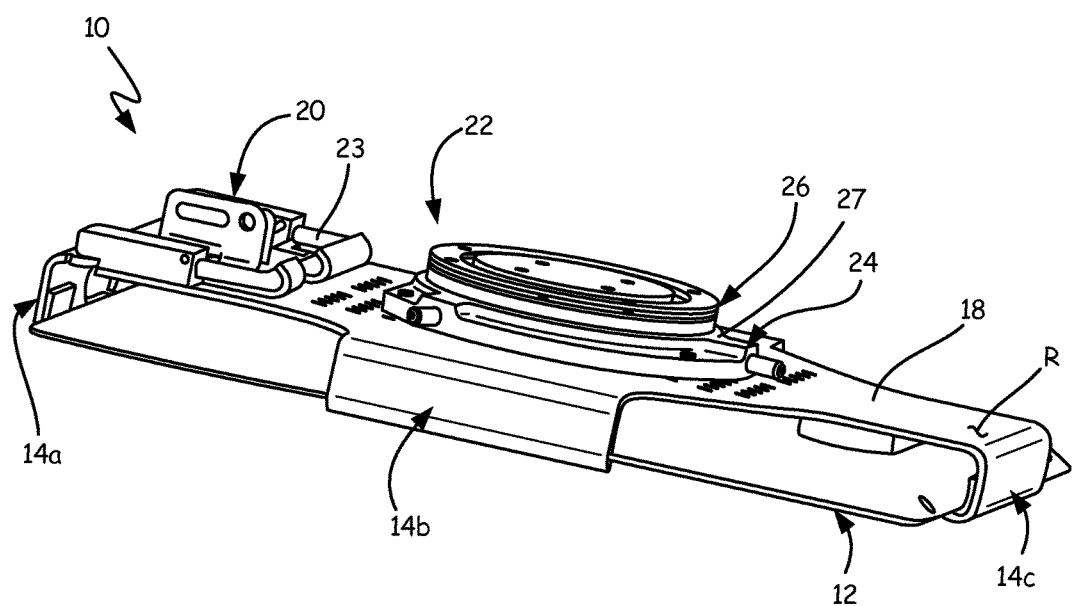
FIG. 2 is a side isometric view of a display device holder and mount.

FIG. 2 is a side isometric view of mount system 10 and display device 12. In this view display device 12 is facing down. Mount system 10 includes arms 14a-14d (only arms 14a-14c are shown in FIG. 2), main support 18, locking assembly 20, and rotation assembly 22. Locking assembly 20 includes handle 23. Rotation assembly 22 includes rotation bearing 24 and rotation mount 26. Rotation bearing 24 includes rotation flange 27. FIG. 2 also shows display device 12 and rear surface R.

Main support 18 is comprised of a rigid material that is substantially planar, except for arms 14a-14d. Arms 14a-14d extend from a periphery of main support 18, and break from main support 18, away from rear surface R and towards display device 12. Arms 14a-14d extend orthogonally from main support 18, and then break again, to partially extend parallel to main support 18 in a separate plane.

Locking assembly 20 is connected to rear surface R of main support 18 near arm 14a. Locking assembly can include a handle, as shown in FIG. 2. Also connected to rear surface R of main support 18 is rotation assembly 22. Rotation bearing 24, of rotation assembly 22, connects to main support 18 through fasteners which can pass through holes drilled into main support 18, securing rotation bearing 24 to main support 18. Rotation mount 26 is connected to a portion of rotation bearing 24, securing rotation mount 26 to rotation bearing 24. Rotation mount 26 can be connected to a surface in addition to rotation bearing 24. For example, rotation mount 26 can be attached to a surface within a cockpit of an aircraft, as shown in FIG. 1.

In one embodiment, rotation bearing 24 is a substantially circular bearing fastened to main support 18. Rotation bearing 24 can include an insert (not shown) that is concentrically circular with rotation flange 27, where the insert engages the inside diameter of rotation flange 27. The insert can then rotate within and relative to rotation flange 27 and therefore relative to main support 18.

In operation of one embodiment, display device 12 can be inserted into main support 18. Arm 14a can then be moved to a secure position, so that arms 14a-14d, along with main support 18 secure display device 12, and restrain the movement of display device 12 relative to main support 18 and mount system 10.

Additionally, rotation mount 26 can be attached to a surface, for example cockpit surface CS, as shown in FIG. 1. Fasteners, such as bolts, screws, rivets, and the like, can secure rotation mount 26 to the surface, and therefore rotation assembly 22, main support 18, mount system 10, and display device 12 to the surface. While secured to the surface, rotation bearing 24 can allow main support 18 to rotate relative to rotation mount 26, thereby enabling the rotation of mounting system 10 and display device 12 relative to rotation mount 26. This enables a user to, for example, rotate display device 12 and main support 18 from portrait to landscape orientation. Rotation mount 26 can enable this operation while rotation mount 26 is locked to the surface to which it is mounted, as described in further detail below.

Figure 3B:
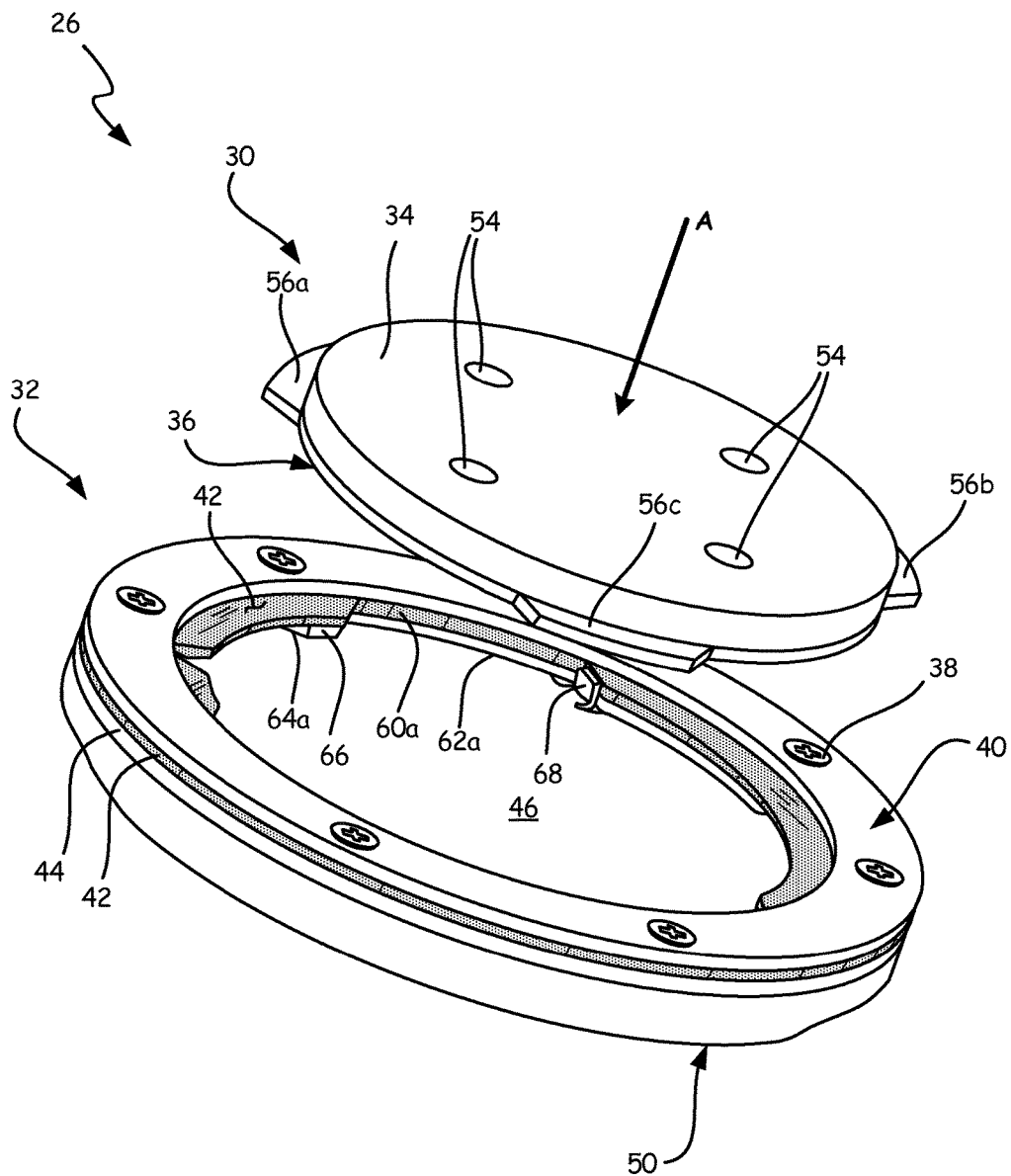
FIG. 3B is an exploded the receiver and insert of FIG. 3A.

FIG. 3A is an exploded side isometric view of rotation mount 26. FIG. 3B is a side isometric view of rotation mount 26. FIGS. 3A and 3B are discussed concurrently.

Rotation mount 26 includes key insert 30 and keyed receiver 32. Key insert 30 includes key base 34 and key plate 36. Keyed receiver 32 includes fasteners 38, retaining ring 40, entrance ring 42, key set ring 44, spring plate 46, spring 48, and receiver base 50. Also shown in FIG. 3B is force A.

Key plate 36 is a substantially circular plate, or cylinder, as is key base 34. In one embodiment, the height or thickness of key plate 36 is substantially smaller than the thickness of key base 34. Key plate 36 and key base 34 are concentric, having substantially the same diameter. In other embodiments, the diameters of key plate 36 and key base 34 may be different. Further, in some embodiments, key plate 36 and key base 34 can be of other geometric shapes, such as a triangular prism, for example.

Key plate 36 is attached to key base 34 with fasteners (not shown), such as screws, rivets, and the like. In some embodiments, key plate 36 and key base 34 can be fastened through another method such as welding or brazing. In some embodiments, key plate 36 and key base 34 can be comprised of a single piece of material, such as metal, plastic, or another suitable material.

Retaining ring 40, entrance ring 42, key set ring 44, spring plate 46, and receiver base 50 are substantially circular and concentric, and are comprised of a rigid material, such as metal, plastic, and the like. Spring 48, which can be a wave spring comprised of spring steel in one embodiment, is concentric with the components of keyed receiver 32 as well. Spring 48 can also be other types of springs, such as one or more coil compression spring, torsion spring, torsion bar, or spring washer.

Retaining ring 40, entrance ring 42, and key set ring 44 are rings, or hollow cylinders having a small axial height or thickness relative to their diameter. Retaining ring 40, entrance ring 42, and key set ring 44 have substantially similar outer diameters, with varying inner diameters. Receiver base 50 has a larger thickness than, but a similar outer diameter to retaining ring 40, entrance ring 42, and key set ring 44.

Retaining ring 40, entrance ring 42, and key set ring 44, are fastened to receiver base 50 with fasteners 38, which can be screws, rivets, and the like. Spring plate 46 and spring 48 are disposed between retaining ring 40, entrance ring 42, key set ring 44, and receiver base 50. Spring plate 46 is free to move between receiver base 50 and key set ring 44, as limited by spring 48, which biases spring plate 46 to contact key set ring 44.

In operation of one embodiment, key plate 36 of key insert 30 can be inserted through retaining ring 40 and into entrance ring 42 when key plate 36 is properly indexed within entrance ring 42. Then, force A can be applied to key plate 36 through key base 34, which transfers to spring plate 46. Thereafter, spring plate 46 can move towards receiver base 50 allowing key plate 36 to enter into key set ring 44, and move beyond key set ring 44. Key plate 36 can then be rotated about its center to lock key plate 36 into key set ring 44. When force A is removed from key insert 30, spring 48 and spring plate 46 will return, preventing key plate 36 from rotating when key plate 36 is locked in key set ring 44. This process can be reversed as described below in FIGS. 4A-4D. The components discussed are described in further detail below.

Key insert 30 includes key base 34 and key plate 36. Keyed receiver 32 includes fasteners 38, retaining ring 40, entrance ring 42, key set ring 44, spring plate 46, spring 48, and receiver base 50. Retaining ring 40, entrance ring 42, key set ring 44, and receiver base 50 include holes 58. Key base 34 and key plate 36 include bores 54. Key plate 36 includes key features 56a-56c.

Retaining ring 40, entrance ring 42, key set ring 44, and receiver base 50 include holes 58 (shown in FIG. 3A). Entrance ring 42 includes index notches 60a-60c (all shown in FIG. 3A). Key set ring 44 includes receiving notches 62a-62c (all shown in FIG. 3A), locking notches 64a-64c (all shown in FIG. 3A), and teeth 66 (all shown in FIG. 3A). Spring plate 46 includes stops 68. Receiver base 50 includes flange 70, boss 72, channel 74, and receiver bores 76 (shown only in FIG. 3A). These components of rotation mount 26 connect and operate consistently with the description above. However, the following description provides additional detail.

Key plate 36 is attached to key base 34 as described above. Key plate 36 is a substantially circular plate. Extending from a periphery of key plate 36 are key features 56a-56c. As shown in FIG. 3A, key features 56a-56c can be spaced around the perimeter of key plate 36. Key features 56a-56c can be equally spaced around the circumference of key plate 36. In other embodiments, key features 56a-56c can be spaced asymmetrically. Each of key features 56a-56c protrude from the periphery of key plate 36 creating a trapezoid with parallel arcs (considering the diameter of key plate 36 as a component). However, key features 56a-56c can have other geometric shapes, such as an isosceles trapezoid.

Key features 56a-56c can all be of the same size. Additionally, key features 56a-56c can be of varying sizes, and can all be of different sizes. Key features 56a-56c can vary in radial height or thickness, circumferential length, or both. Also, though there are three of key features 56a-56c, fewer or more key features can be used. For example, two key features can be used. Key features 56a-56c can be subtractively manufactured into key plate 36 through a machining, stamping, or cutting process. Also, key plate 36 can be formed to include bores 54 and key features 56a-56c through a process such as metal injection molding, casting, plastic injection molding, or additive manufacturing (commonly referred to as 3D printing).

Entrance ring 42 includes index notches 60a-60c (all shown in FIG. 3A), which are notches or reductions in inner diameter of entrance ring 42. Index notches 60a-60c can be subtractively manufactured into entrance ring 42 through a machining, stamping, or cutting process. Also, entrance ring 42 can be formed to include holes 38 and index notches 60a-60c through a process such as metal injection molding, casting, plastic injection molding, or additive manufacturing.

Key set ring 44 includes receiving notches 62a-62c and locking notches 64a-64c (all shown in FIG. 3A), which are notches or reductions in inner diameter of key set ring 44. Between receiving notches 62a-62c and locking notches 64a-64c are teeth 66 (all shown in FIG. 3A). Receiving notches 62a-62c and locking notches 64a-64c can be subtractively manufactured into key set ring 44 through a machining, stamping, or cutting process, which simultaneously forms teeth 66. Also, key set ring 44 can be formed to include holes 38, receiving notches 62a-62c, and locking notches 64a-64c through a process such as metal injection molding, casting, plastic injection molding, or additive manufacturing.

The profile of each of index notches 60a-60c (all shown in FIG. 3A) is a trapezoid with parallel arcs (considering the diameters of key plate 36 as components). The profile of each of index notches 60a-60c can be shaped so that it can receive only one of key features 56a-56c. In other embodiments, index notches 60a-60c can be configured to receive any of key features 56a-56c. Also, key features 56a-56c and index notches 60a-60c can be spaced so that index notches 60a-60c will receive key features 56a-56c in only one alignment. The profile, size, and shape of receiving notches 62a-62c and locking notches 64a-64c (all shown in FIG. 3A) can be sized and shaped similarly to index notches 60a-60c, but receiving notches 62a-62c and locking notches 64a-64c will be limited based on the interference between receiving notches 62a-62c and locking notches 64a-64c. Further, in a preferred embodiment, index notches 60a-60c and receiving notches 64a-64c account for less than half of the inner circumference of entrance ring 42 and key set ring 44, respectively. This allows for the inclusion of teeth 66 in key set ring 44.

In a preferred embodiment, index notches 60a-60c of entrance ring 42 and receiving notches 62a-62c of key set ring 44 are in alignment when entrance ring 42 and key set ring 44 are connected. In some embodiments, the alignment of index notches 60a-60c and receiving notches 62a-62c is facilitated by identical or similar geometric shaping and sizing of index notches 60a-60c and receiving notches 62a-62c. In other embodiments, receiving notches can facilitate alignment by being larger than index notches 60a-60c.

Spring plate 46, as shown in FIG. 3A, is a substantially circular plate having a diameter that is greater than the inner diameter of key set ring 44, but smaller than the outer diameter of key set ring 44. Stops 68 of spring plate 46 are small extensions of spring plate 46 breaking from spring plate 46 and extending perpendicularly from the surface of spring plate 46. Stops 68 extend away from receiver base 50 and towards retaining ring 40, but do not extend past retaining ring 40.

Channel 74 (shown in FIG. 3A) is a channel between boss 72 and flange 70. The height of boss 72 is smaller than the height of flange 70. This provides spring plate 46 with the freedom to move. Receiver base 50 has mounting bores 76, for connecting receiver base 50 to another surface, such as rotation bearing 24 (as shown in FIG. 2). Mounting bores 76 (shown in FIG. 3A) are located radially between boss 72 and flange 70, in channel 74. In some embodiments, mounting bores 76 can be counter sunk bores so that fasteners connecting receiver base 50 to another surface do not contact spring 48. In some embodiments, mounting bores can undercut boss 72, allowing for the diameter of the fastener used to be greater than the width, radially with respect to receiver base 50, of channel 74.

In some embodiments, retaining ring 40, entrance ring 42, key set ring 44, and receiver base 50 are stacked, concentrically, in a non-planar arrangement. Retaining ring 40 is mated to a first surface of entrance ring 42 and a first surface of key set ring 44 is mated to a second surface of entrance ring 42. A second surface of key set ring 44 is mated to flange 70 of receiving base 50. When retaining ring 40, entrance ring 42, key set ring 44, and receiver base 50 are stacked, holes 58 of retaining ring 40 can align with holes 58 of entrance ring 42, key set ring 44, and receiver base 50. Fasteners 38 can pass through holes 58 retaining ring 40, entrance ring 42, and key set ring 44 and fasten to holes 58 in flange 70. Also, holes 58 (shown in FIG. 3A) of entrance ring 42, key set ring 44, and receiver base 50 can connect to fasteners 38. For example, holes 58 of entrance ring 42, key set ring 44, and receiver base 50 can be tapped to receive fasteners 38, which can be threaded.

Spring plate 46 and spring 48 are disposed between retaining ring 40, entrance ring 42, key set ring 44, and receiver base 50. Spring 48 resides in channel 74 of receiver base 74, protruding, when not compressed, above the surface of boss 72. Spring plate 46 is sprung by spring 48, and is free to move between receiver boss 74 of receiver base 50 and the second surface of key set ring 44. Spring 48 biases spring plate 46 to contact key set ring 44. In another embodiment, spring 48 can be an array of compression coil springs circumferentially disposed in channel 74. The operations of these components are described in detail in FIGS. 4A-4D below.

FIGS. 4A-4D are cross sectionals views of key insert 30 and key receiver 32 of FIGS. 3A and 3B at different stages of a locking process. FIGS. 4A-4D are discussed concurrently.

Key insert 30 includes key base 34 (removed for better illustration) and key plate 36. Keyed receiver 32 includes fasteners 38, retaining ring 40, entrance ring 42, key set ring 44, spring plate 46, spring 48, and receiver base 50. Retaining ring 40, entrance ring 42, key set ring 44, and receiver base 50 include holes 58. Key plate 36 includes bores 54 and key features 56a-56c (with only key feature 56a shown).

Retaining ring 40, entrance ring 42, key set ring 44, and receiver base 50 include holes 58. Entrance ring 42 includes index notches 60a-60c (with only index notch 60a shown). Key set ring 44 includes receiving notches 62a-62c (with only receiving notch 62a shown), locking notches 64a-64c (with only locking notch 60a shown), and teeth 66. Spring plate 46 includes stops 68. Receiver base 50 includes flange 70, boss 72, and channel 74. These components of rotation mount 26 are connected consistently with the description above. The components of FIGS. 4A-4D are connected and operate consistently with FIGS. 3A and 3B. However, the following description provides additional detail.

Figure 4A:
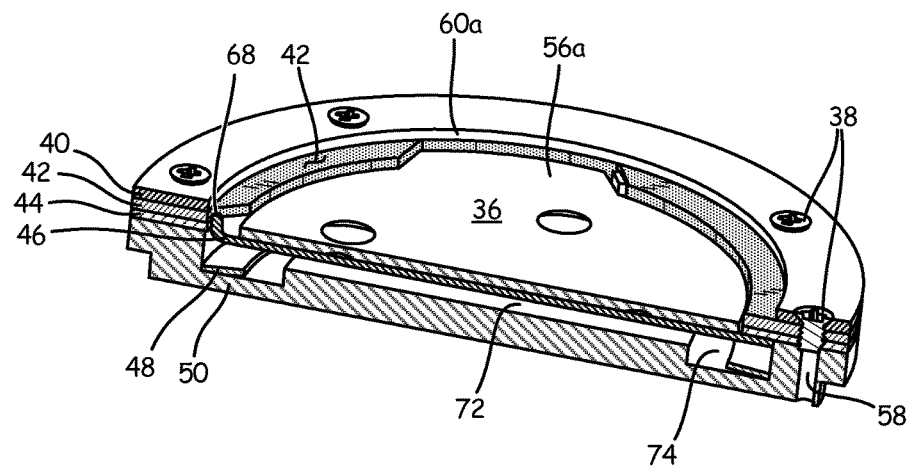
FIGS. 4A-4D are cross sectional views of the mount of FIGS. 3A and 3B at different stages of a locking process.

In operation of one embodiment, key plate 36 can be inserted through retaining ring 40 and into entrance ring 42 when key features 56a-56c are indexed so that index notches 60a-60c can receive them. For example, as shown in FIG. 4A, key feature 56a can be inserted into indexing notch 60a. At this point, key plate 36 is substantially level with entrance ring 42, and key features 56a-56c cannot be rotated, because key features 56a-56c will contact indexing notches 60a-60c of entrance ring 42, or stops 68. For example, as shown in FIG. 4A, key feature 56a cannot be rotated, because it will contact indexing notch 60a or stop 68. At this state, spring plate 46 contacts the underside of key set ring 44, as set spring plate 46 is biased to do so by spring 48. In this position, spring plate 46 prevents key feature 56a from moving towards receiver base 50.

Figure 4B:
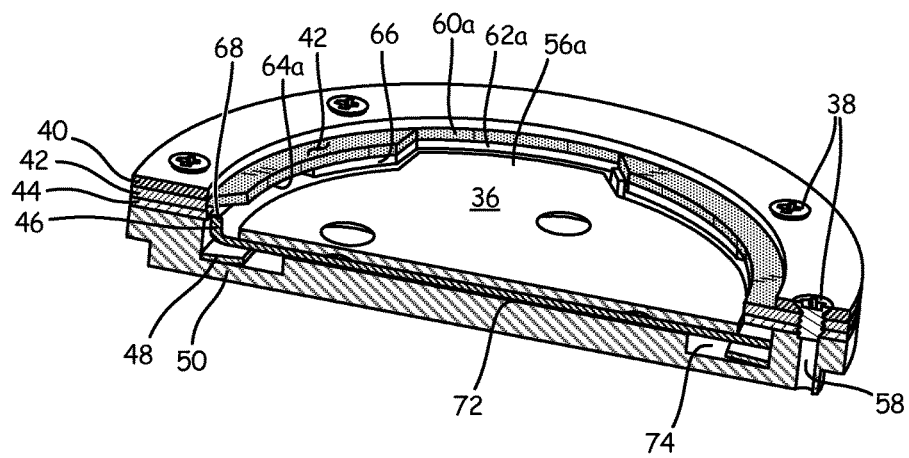

When key feature 56a is properly indexed within indexing notch 60a, force A can be applied to key plate 36 (as shown in FIG. 4B), which is transferred to spring plate 46. When force A is sufficiently large, the force applied on spring plate 46 by spring 48 will be overcome by force A, causing spring plate 46 to move towards boss 72 and away from key set ring 44. When spring plate is displaced far enough towards boss 72, key features 56a-56c will enter into receiving notches 62a-62c, respectively. For example, as shown in FIG. 4B, key feature 56a will enter into receiving notch 62a. If key feature 56a is not indexed correctly, force A will not be transferred to spring plate 46, because key feature 56a will contact the first (top) surface of entrance ring 42.

As force A continues to be applied, key features 56a-56c will move past receiving notches 62a-62c, respectively, and can force spring plate 46 to contact boss 72. For example, as force A is applied, key feature 56a will move past indexing notch 60a and receiving notch 62a, and can force spring plate 46 to contact boss 72, as shown in FIG. 4B. At this point, key plate 36 can be turned. In some embodiments key plate 36 can be rotated after spring key features 56a-56c have cleared key set ring 44, but before spring plate 46 contacts boss 72.

The rotation of key plate 36 about its center in a counter-clockwise direction of rotation results in the rotation of key features 56a-56c. As shown in FIG. 4B, key feature 62a (and therefore key features 62b and 62c) can only be turned counter-clockwise, as stop 68 prevents key feature 56a from rotating in the clock-wise direction. Stops 68 also prevents spring plate 46 from rotating, by contacting opposite edges of receiving notches 62a and 62b. Other embodiments can have one or no stops. Similarly, other embodiments can have more than two of stops 68.

Figure 4C:
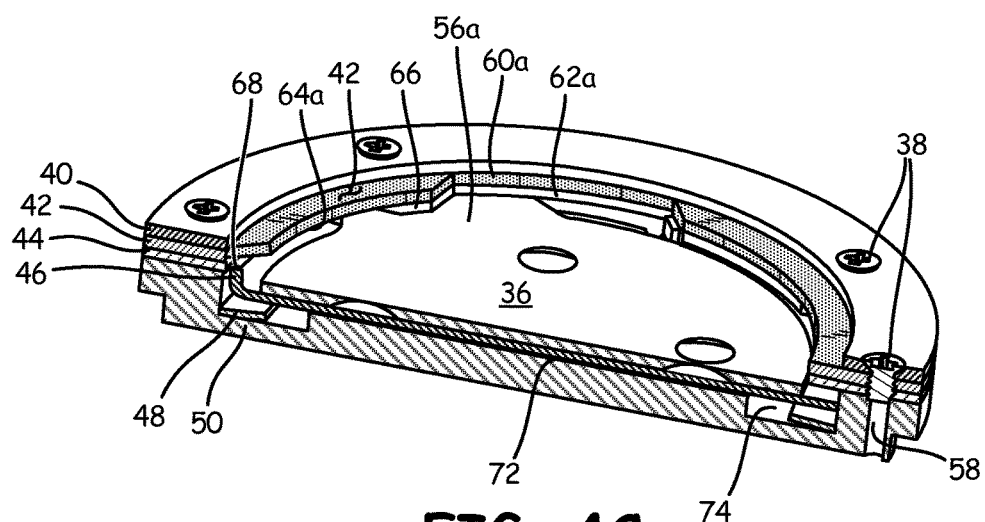

Key plate 36 and key feature 56a can be rotated counter-clockwise between key set ring 44 and spring plate 46, as shown in FIG. 4C. Shortly after rotation has begun, the surface of teeth 66 overlap with the surfaces of key features 56a-56c. For example, a first surface (or top surface relative to FIG. 4C) of key feature 56a contacts (or nearly contacts) tooth 66 as it rotates between tooth 66 and spring plate 46. If force A is removed at this step in the process of rotation, tooth 66 will hold key feature 56a between key set ring 44 and spring plate 46, preventing spring 48 from returning key feature 56a and key plate 36 to level with entrance ring 42.

Figure 4D:
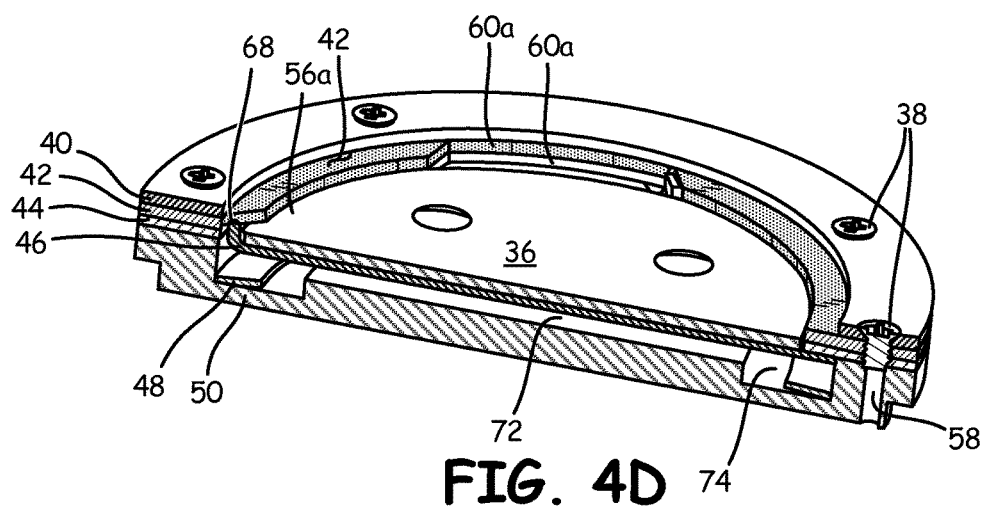

When key features 56a-56c are rotated far enough, they will reach locking notches 64a-64c, respectively. As shown in FIG. 4D, when key featured 56a is rotated further counter-clockwise between key set ring 44 and spring plate 46, it can align with locking notch 64a. Stops 68 prevent key features 56a-56c from over-rotating, or rotating past locking notches 64a-64c. For example, stop 68 prevents key feature 56a from rotating past locking notch 64a. In other words, stops 68 define a range of rotation of key features 56a-56c.

When key features 56a-56c are aligned with locking notches 64a-64c and force A is removed, key features 56a-56c can enter the recess of locking notches 64a-64c. Then, spring plate 46 will return to contacting key set ring 44, and will also contact key features 56a-56c. This prevents key plate 36 from rotating when key plate 36 is locked in key set ring 44. For example, when key feature 56a and locking notch 64a are aligned and force A is removed, or reduced to be smaller than the force applied by spring 48, spring plate 46 will move key plate 36 away from boss 72. Spring plate can continue to travel towards key set ring 44 until it contacts key set ring 44, which prevents spring plate 46 from moving further away from boss 72. When spring plate 46 engages key set ring 44, as shown in FIG. 4D, key feature 56a will contact entrance ring 42, and will also be prevented from moving away from boss 72. This is possible when, in some embodiments, key plate 36 is substantially the same thickness as set ring 42. Key feature 56a and therefore key plate 36 will be prevented from rotating in either direction by locking notch 64a and stop 68. This affirmatively locks key feature 56a, key plate 36, and key insert 30 into key receiver 32.

This process can be reversed. Key plate 36 can be unlocked from receiver 32 by applying force A on key insert 30, rotating key plate 36 and key features 56a-56c back to alignment with receiving notches 62a-62c, and removing key plate 36 from key receiver 32. These embodiments can provide several benefits.

For example, rotation mount 26 provides the ability to remove mount system 10 from a surface without the use of a tool, increasing the portability of mount system 10 and display device 12.

Also, crash forces and crash testing forces are typically linear and uni-directional. Some mounting systems in the prior art have joints that are separable by these types of crash and crash simulation forces. This disclosure addresses this issue by using rotation mount 26, which locks through rotational movement of insert 30 relative to key receiver 32. Because rotation mount 26 requires rotational forces to lock and unlock, crash testing does not apply a force that would unlock rotation mount 26. Thus, mount system 10 can be approved for use in an aviation application more easily than the mounts of some prior art.

Further, retaining ring 40 can provide the benefit of blind alignment. Because rotation mount 26 can be connected to rear surface R of mount system 10, locking insert 30 and receiver 32 may not be visible when inserting insert 30 into receiver 32, for example, in a cockpit, as shown in FIG. 1. Retaining ring 40 allows key features 56a-56c to be blindly aligned in the X-Y plane (where the Z direction is in the direction of force A). That is, retaining ring 40 enables the use of feel to align key plate 36 within retaining ring 40, so that key plate 36 can be easily aligned without seeing the interaction between these components. The remainder of the locking operation can then be performed blindly as well. Key features 56a-56c can be indexed to receiving notches 60a-60c. Key plate 36 can move spring plate 46 and key features 56a-56c can be rotated to engage locking notches 64a-64c, respectively. The reverse of this process can also be performed blindly, which allows for quick and convenient locking and unlocking of rotation mount 26. Further, stops 68 provide the benefit of limiting rotation to useful rotation or useful travel. This saves time when locking insert 30 to receiver 32.

Also, the construction of receiver 32 and insert 30, being comprised of stacked layers of thin material, such as metal, offer a benefit of having a small thickness or profile. This is beneficial to keep a low overall profile of mount system 10. This is especially beneficial when mount system 10 is mounted in a cockpit of an aircraft. Being low profile helps to avoid interference of mount system 10 with other components in the cockpit, such as a tiller.

When key features 56a-56c have different geometric sizes, or when indexing notches 60a-60c are configured to receive only one of key features 56a-56c, key insert 30 can be indexed relative to key receiver 32 quickly. This feature can also provide the benefit of ensuring that mount system 10 is secured to a mounting surface in a desired orientation, such as portrait or landscape, which can also save time.

Discussion of Possible Embodiments

The following are non-exclusive descriptions of possible embodiments of the present invention.

A mount includes a keyed insert and a key receiver. The keyed insert includes a key base and a keyed plate mounted to the key base and having one or more key features extending from a periphery of the keyed plate. The key receiver accepts the keyed insert and includes a receiver base, a retaining ring, a key set ring, a key entrance ring, and a spring plate. The retaining ring is connected to the receiver base. The key set ring is disposed between the retaining ring and the receiver base and includes one or more receiving notches and one or more locking notches. The one or more receiving notches is configured to receive the one or more key features the one or more locking notch is spaced away from the one or more receiving notch and is configured to lockingly engage the one or more key features. The key entrance ring is disposed between the retaining ring and the key set ring, and includes one or more index notch aligned with the one or more receiving notch. The spring plate is movable between the key set ring and the receiver base.

The mount of the preceding paragraph can optionally include, additionally and/or alternatively, any one or more of the following features, configurations, and/or additional components.

The spring plate can be configured to be displaced by the key plate to allow the key feature to rotate amid the key set ring and the spring plate between the one or more receiving notches and the one or more locking notches.

The spring plate can include stops that define a range of rotation of the one or more key features between the one or more receiving notches and the one or more locking notches.

A spring can apply a force on the spring plate and the receiver, which can bias the spring plate to contact the key set ring.

The spring can be a wave spring.

A spring retainer channel can be between a center and a perimeter of the receiver base.

A boss can restrict travel of the spring plate in an axial direction within the receiver.

The key plate can include a plurality of key features, and the key set ring can include a plurality of receiving notches and a plurality of locking notches, and the key entrance ring can include a plurality of index notches.

The plurality of key features can have different geometric shapes.

Each index notch of the plurality of index notches can have a geometrical shape configured to receive only one key feature of the plurality of key features.

The plurality of key features can be disposed along than half of a perimeter of the key plate.

The key base, the receiving base, the retaining ring, the key set ring, key entrance ring, and spring plate can be substantially circular.

The key receiver can be include a display device holder that can be connected to the key receiver.

In another embodiment, a system for securing a display device within a aircraft cockpit includes a device holder and a mount. The device holder has a front surface and a rear surface, and the front surface is configured to receive the display device. The mount is connected to the rear surface of the device holder. The mount includes a keyed insert and a key receiver. The keyed insert includes a key base and a keyed plate mounted to the key base and having one or more key features extending from a periphery of the keyed plate. The key receiver accepts the keyed insert and includes a receiver base, a retaining ring, a key set ring, a key entrance ring, and a spring plate. The retaining ring is connected to the receiver base. The key set ring is disposed between the retaining ring and the receiver base and includes one or more receiving notches and one or more locking notches. The one or more receiving notches is configured to receive the one or more key features the one or more locking notch is spaced away from the one or more receiving notch and is configured to lockingly engage the one or more key features. The key entrance ring is disposed between the retaining ring and the key set ring, and includes one or more index notch aligned with the one or more receiving notch. The spring plate is movable between the key set ring and the receiver base.

The system of the preceding paragraph can optionally include, additionally and/or alternatively, any one or more of the following features, configurations, and/or additional components.

The key receiver can be mounted to the device holder.

The keyed insert can be mounted to a part of the cockpit.

The spring plate can be configured to be displaced by the key plate to allow the key feature to rotate amid the key set ring and the spring plate between the receiving notch and the locking notch.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A mount for attaching a display device to a surface, the mount comprising:
 a keyed insert comprising:
  a key base; and
  a keyed plate mounted to the key base and having one or more key features extending from a periphery of the keyed plate;
 a key receiver that accepts the keyed insert, the key receiver comprising:
  a receiver base;
  a retaining ring connected to the receiver base;
  a key set ring disposed between the retaining ring and the receiver base, the key set ring comprising:
   one or more receiving notches configured to receive the one or more key features; and one or more locking notches spaced away from the receiving notch and configured to lockingly engage the one or more key features;

a key entrance ring disposed between the retaining ring and the key set ring, the key entrance ring comprising one or more index notches aligned with the one or more receiving notches; and a spring plate movable between the key set ring and the receiver base.

2. The mount of claim 1, wherein the spring plate is configured to be displaced by the key plate to allow the one or more key features to rotate amid the key set ring and the spring plate between the one or more receiving notches and the one or more locking notches.

3. The mount of claim 2, wherein the spring plate comprises stops that define a range of rotation of the one or more key features between the one or more receiving notch and the one or more locking notch.

4. The mount of claim 1, wherein the key receiver further comprises a spring that applies a force on the spring plate and the receiver, which biases the spring plate to contact the key set ring.

5. The mount of claim 4, wherein the spring is a wave spring.

6. The mount of claim 4, wherein the receiver base further comprises a spring retainer channel between a center and a perimeter of the receiver base.

7. The mount of claim 1, wherein the receiver base further comprises a boss that restricts travel of the spring plate in an axial direction within the receiver.

8. The mount of claim 1, wherein the key plate comprises a plurality of key features, wherein the key set ring comprises a plurality of receiving notches and a plurality of locking notches, and wherein the key entrance ring comprises a plurality of index notches.

9. The mount of claim 8, wherein the plurality of key features have different geometric shapes.

10. The mount of claim 9, wherein each index notch of the plurality of index notches has a geometrical shape configured to receive only one key feature of the plurality of key features.

11. The mount of claim 7, wherein the plurality of key features are disposed along less than half of a perimeter of the key plate.

12. The mount of claim 1, wherein the key base, the receiving base, the retaining ring, the key set ring, key entrance ring, and spring plate are substantially circular.

13. The mount of claim 1, further comprising a display device holder, wherein the display device holder is connected to the key receiver.

14. A system for securing a display device within an aircraft cockpit, the system comprising:

a device holder having a front surface and a rear surface, wherein the front surface is configured to receive the display device;

a mount connected to the rear surface of the device holder, the mount comprising:

a keyed insert comprising:

a key base; and a keyed plate mounted to the key base and having one or more key feature extending from a periphery of the keyed plate;

a key receiver that accepts the keyed insert, the key receiver comprising:

a receiver base;

a retaining ring connected to the receiver base;

a key set ring disposed between the retaining ring and the receiver base, the key set ring comprising:

one or more receiving notches configured to receive the one or more key features; and one or more locking notches spaced away from the receiving notch and configured to lockingly engage the one or more key features;

a key entrance ring disposed between the retaining ring and the key set ring, the key entrance ring comprising one or more index notch aligned with the one or more receiving notches; and a spring plate movable between the key set ring and the receiver base.

15. The system of claim 14, wherein the key receiver is mounted to the device holder.

16. The system of claim 15, wherein the keyed insert is mounted to a part of the cockpit.

17. The mount of claim 14, wherein the spring plate is configured to be displaced by the key plate to allow the one or more key features to rotate amid the key set ring and the spring plate between the receiving one or more notches and the one or more locking notches.

18. The mount of claim 14, wherein the key receiver further comprises a spring that applies a force on the spring plate and the receiver base, which biases the spring plate to contact the key set ring.

19. The mount of claim 14, wherein the key plate comprises a plurality of key features, wherein the key set ring comprises a plurality of receiving notches and a plurality of locking notches, wherein the key entrance ring comprises a plurality of index notches.

20. The mount of claim 14, wherein the key base, the receiving base, the retaining ring, the key set ring, key entrance ring, and spring plate are substantially circular.

* * * * *